: US010917316B2

(12) United States Patent
Parthasarathy et al.

(10) Patent No.: US 10,917,316 B2
(45) Date of Patent: Feb. 9, 2021

(54) CONSTRAINED OPTIMIZATION OF CLOUD MICRO SERVICES

(71) Applicant: International Business Machines Corporation, Armonk, NY (US)

(72) Inventors: Srinivasan Parthasarathy, White Plains, NY (US); Fabio A. Oliveira, White Plains, NY (US); Sushma Ravichandran, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/427,768

(22) Filed: May 31, 2019

(65) Prior Publication Data

US 2020/0382388 A1    Dec. 3, 2020

(51) Int. Cl.
    *G06F 15/173*       (2006.01)
    *H04L 12/24*        (2006.01)
    *G06F 16/2455*     (2019.01)

(52) U.S. Cl.
    CPC .... *H04L 41/5051* (2013.01); *G06F 16/24565* (2019.01)

(58) Field of Classification Search
    CPC .................. H04L 41/5051; G06F 16/24565
    USPC .................................................. 709/217, 223
    See application file for complete search history.

(56) References Cited

U.S. PATENT DOCUMENTS

| 2012/0259807 | A1 | 10/2012 | Dymetman | |
|---|---|---|---|---|
| 2012/0274781 | A1 | 11/2012 | Shet | |
| 2014/0214387 | A1 | 7/2014 | Tilke | |
| 2016/0124742 | A1* | 5/2016 | Rangasamy | ............ H04L 47/70 717/103 |
| 2017/0046146 | A1* | 2/2017 | Jamjoom | ................... G06F 8/62 |
| 2017/0242784 | A1* | 8/2017 | Heorhiadi | ........... H04L 41/5038 |
| 2017/0264493 | A1* | 9/2017 | Cencini | ................. G06F 9/5083 |
| 2018/0349158 | A1* | 12/2018 | Swersky | ................ G06N 20/00 |

OTHER PUBLICATIONS https://developers.redhat.com/blog/2017/06/01/microservices-patterns-with-envoy-proxy-part-ii-timeouts-and-retries/ (Year: 2017).*

(Continued)

*Primary Examiner* — Cheikh T Ndiaye
*Assistant Examiner* — Melaku Y Habtemariam
(74) *Attorney, Agent, or Firm* — Daniel Morris; Otterstedt, Wallace & Kammer, LLP

(57) ABSTRACT

A specification of a topology of a microservices application is obtained as a plurality of nodes corresponding to a plurality of microservices of the microservices application. The plurality of nodes includes a root node, each of the plurality of nodes other than the root node has a timeout parameter and a retries parameter. Via constrained black box optimization, optimized values are selected for the timeout parameter and the retries parameter for each of the plurality of nodes other than the root node, subject to satisfying a specified end-to-end latency for the microservices application and minimizing an error rate for the microservices application. The microservices application is configured in accordance with the optimized values. At least one external request to the root node is responded to with the microservices application configured in accordance with the optimized values.

17 Claims, 17 Drawing Sheets

(56) References Cited

OTHER PUBLICATIONS

J. Weare, Efficient Monte Carlo Sampling by Parallel Marginalization, Proceedings of the National Academy of Sciences 104(31):12657-62 • Aug. 2007.
H. Liu, et al., A Bifurcation Monte Carlo Scheme for Rare Event Simulation, Origin: ARXIV, eprint arXiv:1606.00907, Jun. 2016, 20 pages.
Gramacy, Modeling an Augmented Lagrangian for Blackbox Constrained Optimization, Technometrics 58.1 (2016): p. 1-11.
Chorin, Sampling, Feasibility, and Priors in Data Assimilation, Discrete and Continuous Dynamical Systems vol. 36, No. 8, Aug. 2016, 20 pages.
Gelbart, Constrained Bayesian Optimization and Applications. Doctoral dissertation, Harvard University, Graduate School of Arts & Sciences, 2015, 137 pages.
Schmidt, M. (2009). Linearly constrained bayesian matrix factorization for blind source separation. In Advances in neural information processing systems (pp. 1624-1632).
Peter Mell and Timothy Grance, The NIST Definition of Cloud Computing, cover, pp. i-iii and 1-3, NIST Special Publication 800-145 Sep. 2011.

* cited by examiner $$reward = \begin{cases} e^{-\text{excess latency}} - 1 & \text{if latency} > l, \\ 1 - \sum_i w_i\, b_i & \text{if latency} \leq l \end{cases}$$

Weighted error rate

Service level latency agreement (SLA)

FIG. 6

Algorithm 1 Marginalized Gibbs Sampling

Require: Initial valid policy $x$
Ensure: Final random valid policy $y$
1: $y \leftarrow x$
2: while number of iterations < burn-in do ▷ Sweep $y$
3:   for each parameter $z$ in $y$ do
4:     Fix all components of $y$ other than $z$
5:     Compute feasible region $\mathcal{F}$ for $z$ as per (1)
6:     Uniformly sample a value $z'$ from $\mathcal{F}$
7:     $z \leftarrow z'$ ▷ Update $z$
8:   end for
9: end while
10: return $y$

*FIG. 16*

CONSTRAINED OPTIMIZATION OF CLOUD MICRO SERVICES

BACKGROUND

The present invention relates to the electrical, electronic, and computer arts, and more specifically, to the provision of cloud computing services.

Currently, developers create applications by creating them as small modules called microservices. Each microservice generally has limited functionality and communicates with other microservices. For example, consider creation of an app to sell one or more products and/or services. There may be a microservice that provides an initial welcome page with a catalog. When the user clicks on a product, he or she is directed to a web page associated with that product, and is also given a list of recommended products; the recommendation list comes from a different microservice based on what other people who bought/viewed the clicked product have purchased.

Latency (how quickly a microservice responds to the user) is an ongoing issue in systems using microservices.

SUMMARY

Principles of the invention provide techniques for constrained optimization of cloud micro services. In one aspect, an exemplary method includes the step of obtaining a specification of a topology of a microservices application as a plurality of nodes corresponding to a plurality of microservices of the microservices application, the plurality of nodes including a root node, each of the plurality of nodes other than the root node having a timeout parameter and a retries parameter; via constrained black box optimization, selecting optimized values for the timeout parameter and the retries parameter for each of the plurality of nodes other than the root node, subject to satisfying a specified end-to-end latency for the microservices application and minimizing an error rate for the microservices application; configuring the microservices application in accordance with the optimized values; and responding to at least one external request to the root node with the microservices application configured in accordance with the optimized values.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

speeding up the process of discovering good parameters for micro services under constraints;

reducing latency, and thus increasing timely performance, of micro services based systems;

reducing/minimizing error rate of micro services based systems (one or more embodiments simultaneously address both latency and error rate).

These and other features and advantages of the present invention will become apparent from the following detailed description of illustrative embodiments thereof, which is to be read in connection with the accompanying drawings.

BRIEF DESCRIPTION OF THE DRAWINGS

FIG. 6 shows black box formulation, in accordance with an aspect of the invention;

FIG. 16 shows an exemplary algorithm for Marginalized Gibbs Sampling, in accordance with an aspect of the invention.

DETAILED DESCRIPTION

Figure 1:
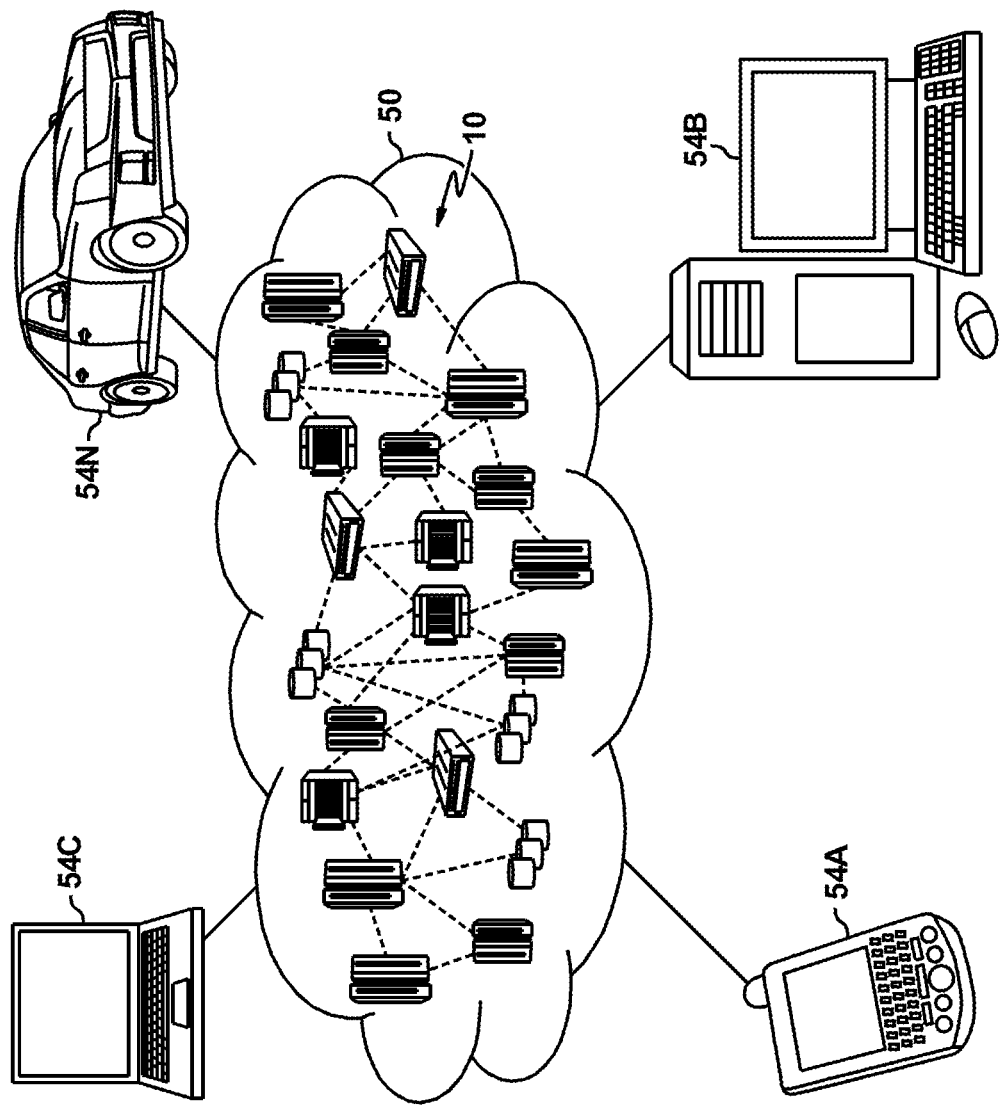
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
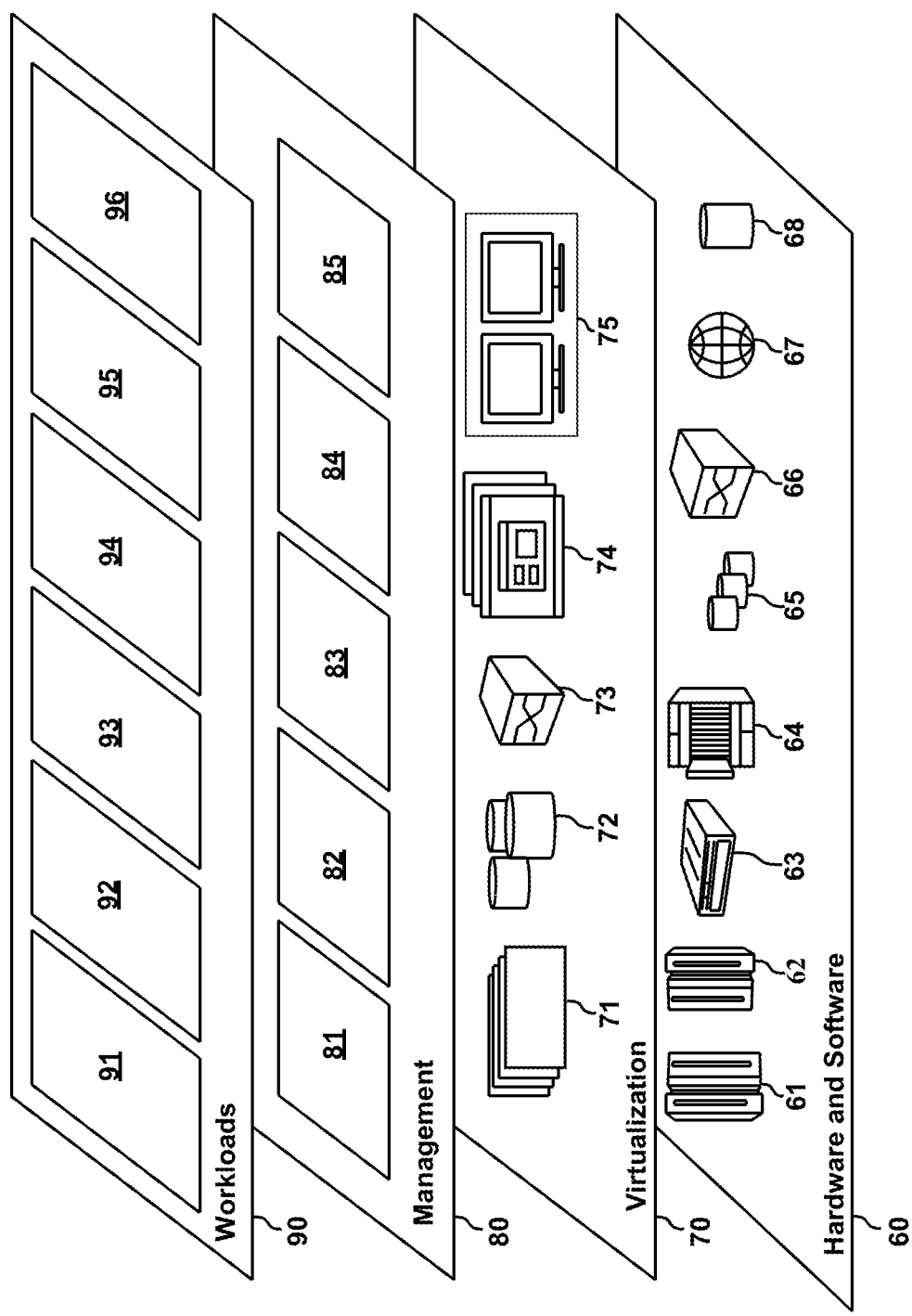
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an application 96 for constrained optimization of cloud micro services; this application could also reside in the management layer if desired, or portions of the functionality could reside in each of layers 80, 90.

One or more embodiments are directed to the optimization of cloud microservices. As noted, currently, developers create applications by creating them as small modules called microservices. Each microservice generally has limited functionality and communicates with other microservices. For example, consider creation of an app to sell one or more products and/or services. There may be a microservice that provides an initial welcome page with a catalog. When the user clicks on a product, he or she is directed to a web page associated with that product, and is also given a list of recommended products; the recommendation list comes from a different microservice based on what other people who bought/viewed the clicked product have purchased.

Suppose there is a third service and the user clicks on a book of interest and now a third microservice makes the user aware of a book signing event in his or her area. This third service may, for example, determine the user's location from his or her profile and access a database of events organized by subject matter, date, and location, and return relevant events near the user.

One or more embodiments deal with elastic applications. In the present context, a micro services based application is the to be elastic if the upstream microservices can tolerate occasionally not obtaining a response within the timeout period from downstream microservices. Some services are mandatory and must work quickly and reliably. Other services are relatively less important (e.g., recommendations), though timely service is still desirable. In general, there may be delays in accessing services, and when such delays occur, it is desirable to get back to the user quickly once access to the service is available. Thus, it is desired to keep latency (how quickly the service gets back to the user) low; say, within a couple of (two) seconds. It is further desirable to get responses from as many of the microservices as possible within those two seconds.

The problems associated with latency of microservices can be framed as an optimization problem. There is a limit on the tolerable amount of latency—say, for example, that it is desired that 80% or 95% of requests finish within two seconds while minimizing errors (e.g., services that did not respond). If the response of one service is missing, there will be a certain error metric; if the responses of two services are missing, there will be a bigger error metric; if the responses of three services are missing, there will be a still bigger error metric; and so on. Some services may be rated as more important than other services.

In one or more embodiments, the problem to be solved is formulated as follows: there is an end-to-end constraint on latency (say 95% of requests must finish within two seconds); it is desired to minimize, within the two seconds, the error metric (e.g., a weighted error function or weighted loss function). This is the goal in one or more embodiments. One or more embodiments control the communication parameters. For example, between any two communicating services in the cloud/network, there are timeouts and retries. One or more embodiments control those two parameters. Timeout refers to an entity (e.g. Service 1) waiting for a service (e.g. Service 2) for a timeout period of time; e.g., three seconds. Service 1 waits for Service 2 to respond for three seconds. If Service 2 does not respond to Service 1 in three seconds; Service 1 is "done" with Service 2. A retry parameter can specify, for example, a number of attempts; e.g., one attempt, two attempts, three attempts, and so on. For example, suppose the timeout parameter is three seconds and the retry parameter is two. The system would wait three seconds for the request; if there was no response, the system would try again and again wait for three seconds, and then give up if no response. Thus, in one or more embodiments there are one or more constraints and it is desired to minimize the error metric.

Figure 3:
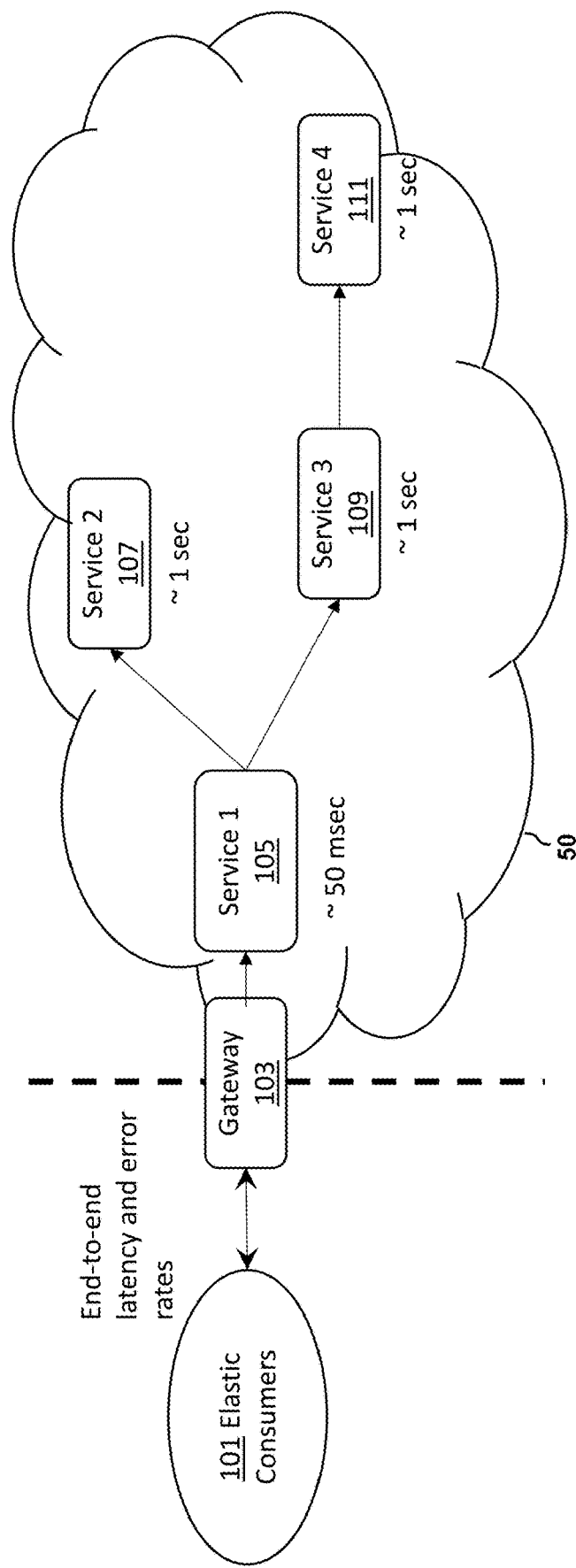
FIG. 3 shows a plurality of interacting microservices amenable to optimization in accordance with an aspect of the invention.

FIG. 3 shows an example scenario with interacting microservices. A plurality of elastic consumers 101 access cloud computing environment 50 via gateway 103. In the example of FIG. 3, there are four microservices 105, 107, 109, and 111. The acceptable latency for service 105 is about 50 msec, while the acceptable latency for services 107, 109, and 111 is each about 1 second.

Figure 4:
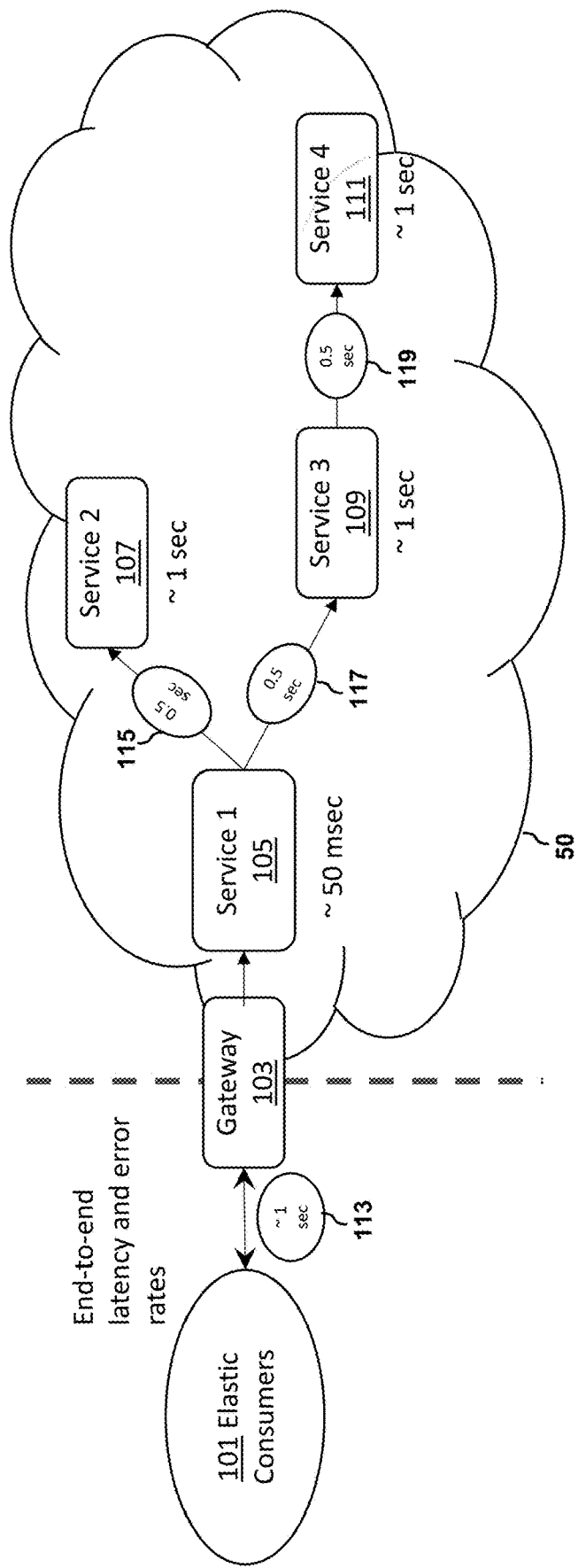
FIG. 4 shows the plurality of interacting microservices of FIG. 3, including a first solution associated with low latency and a high rate of timeouts.
Figure 5:
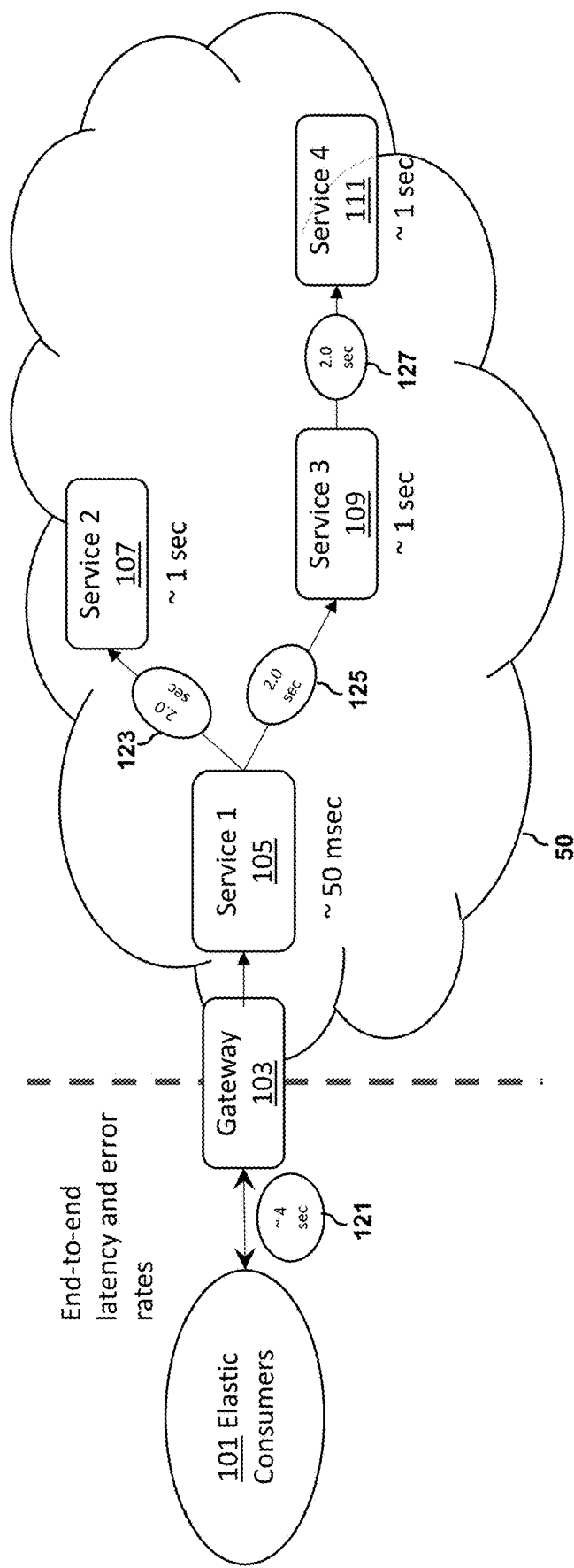
FIG. 5 shows the plurality of interacting microservices of FIG. 3, including a second solution associated with high latency and a low rate of timeouts.

In one or more embodiments, the desired solution is a tuning of the system to optimize the number of retries and the number of timeouts on each service-to-service link. FIGS. 4 and 5 show two possible solutions. The first solution of FIG. 4 is associated with low latency and a high rate of timeouts; while the solution of FIG. 5 is associated with high latency and a low rate of timeouts. The tradeoff is end-to-end latency versus the number of timeouts. For example, in FIG. 4, as seen at 113, the latency between the consumers 101 and gateway 103 is about 1 second; while as seen at 115, 117, and 119, the latency between service 105 and service 107, between service 105 and service 109, and between service 109 and service 111 is, in each case, about 0.5 seconds. On the other hand, in FIG. 5, as seen at 121, the latency between the consumers 101 and gateway 103 is about 4 seconds; while as seen at 123, 125, and 127, the latency between service 105 and service 107, between service 105 and service 109, and between service 109 and service 111 is, in each case, about 2.0 seconds.

Figure 7:
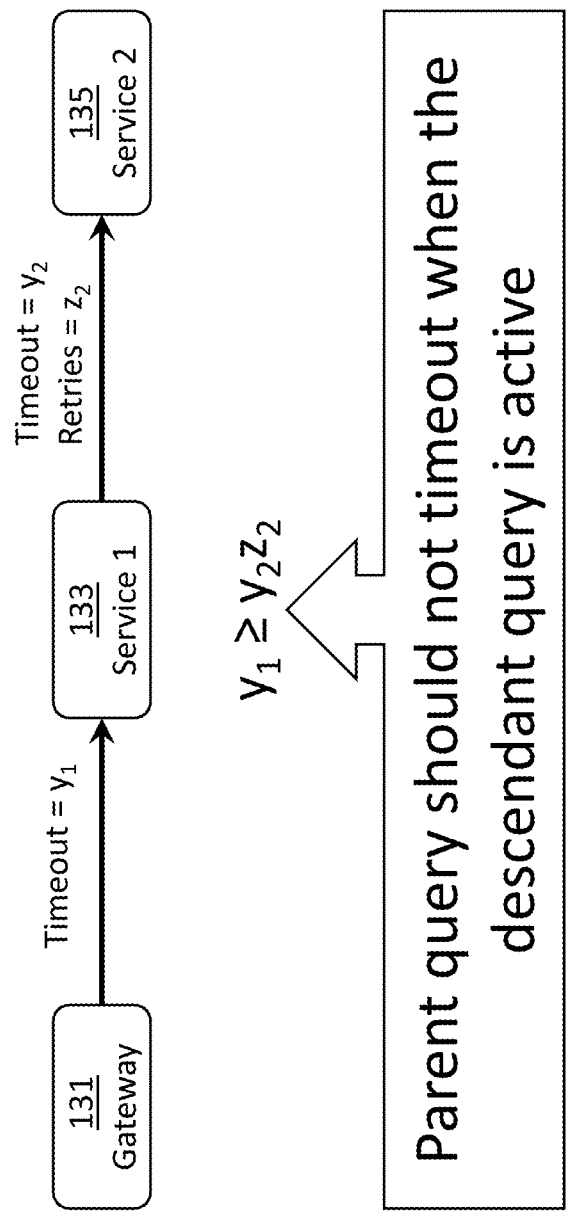
FIG. 7 shows a simple constraint scenario, in accordance with an aspect of the invention.
Figure 8:
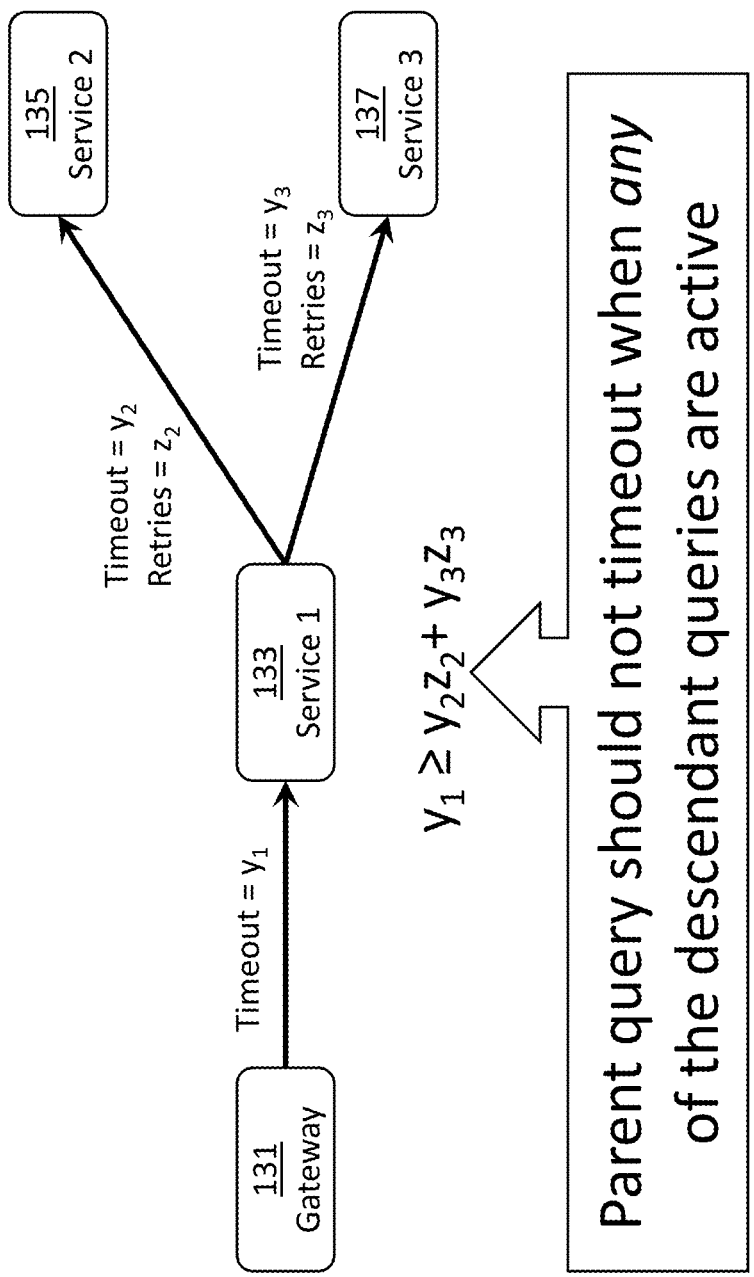
FIG. 8 shows a sequential query constraint scenario, in accordance with an aspect of the invention.
Figure 9:
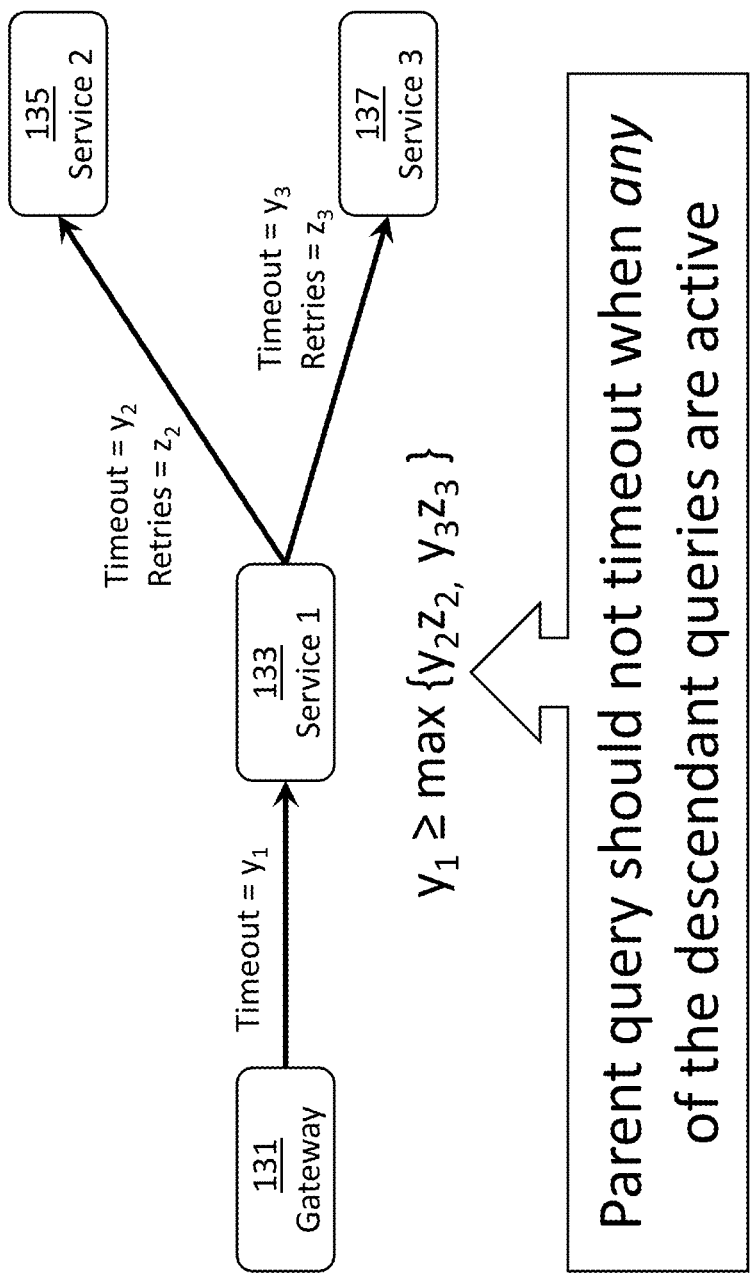
FIG. 9 shows a parallel query constraint scenario, in accordance with an aspect of the invention.

Refer now to FIG. 6. One or more embodiments seek to find timeout and retry values which satisfy a user-specified end-to-end latency (e.g., $90^{th}$ percentile latency≤2.0 sec) and minimize error rate. A reward is determined as shown. A maximum permissible latency, l, is specified by the SLA. If the latency is less than or equal to l, the reward is unity less the weighted error rate (sum over all i of the individual weight times $b_i$ (error rate on a link between two microservices, the fraction of dropped requests—sum is over all links i)). The weights adjust for the relative severity of an error on a particular link versus other links. If the latency is greater than l, the reward is e (the natural number) raised to the negative excess latency power, minus one. Excess latency is the amount by which latency exceeds l. Conventional black box formulation may be problematic in that there is no known algebraic expression for reward in terms of parameters, and/or due to being noisy and expensive to evaluate. A trial and error approach is used in one or more embodiments. This is essentially a constraint optimization problem—FIGS. 7, 8 and 9 show exemplary constraints. Referring first to FIG. 7, the gateway service 131 is an initial service; when the user first accesses the web site, he or she hits the gateway service. Gateway service 131 calls service 133 which in turn calls service 135. The parent query should not time out when the descendant (child) query is active. Suppose the gateway service sends a query to service 133 and says it will wait three seconds for a response. Service 133 can contact service 135 and indicate that it will try once and wait for two seconds. That is acceptable, since service 133 will know within two seconds whether it is getting anything back from service 135, and even in the worst case the gateway service 131 will have at least one second left on its clock. However, consider the case where service 133 tells service 135 it is willing to wait for four seconds. Suppose service 133 gets a response from service 135 after 3.5 seconds. This is unacceptable because the interaction between the gateway service 131 and service 133 has already timed out.

In FIG. 8, service 133 talks to both service 135 and service 137 sequentially (first talk to service 135 and then service 137)—the connection between the gateway 131 and service 133 should not time out until interactions between services 133 and 135 and between services 133 and 137 are finished.

Contributions of one or more embodiments include a way to specify the constraints and/or a way to search for timeout and retry values that satisfy the constraints. In one or more embodiments, the functionality is transparent to the user. For example, the app developer creates the microservices and sets them up in the cloud. Embodiments of the invention observe the services in action, apply black-box optimization, and via trial and error, discover optimal timeout and retry values.

In FIG. 9, service 133 talks to both service 135 and service 137 simultaneously (i.e. talks to service 135 and service 137 in parallel)—the connection between the gateway 131 and service 133 should not time out until interactions between services 133 and 135 and between services 133 and 137 are finished.

Figure 10:
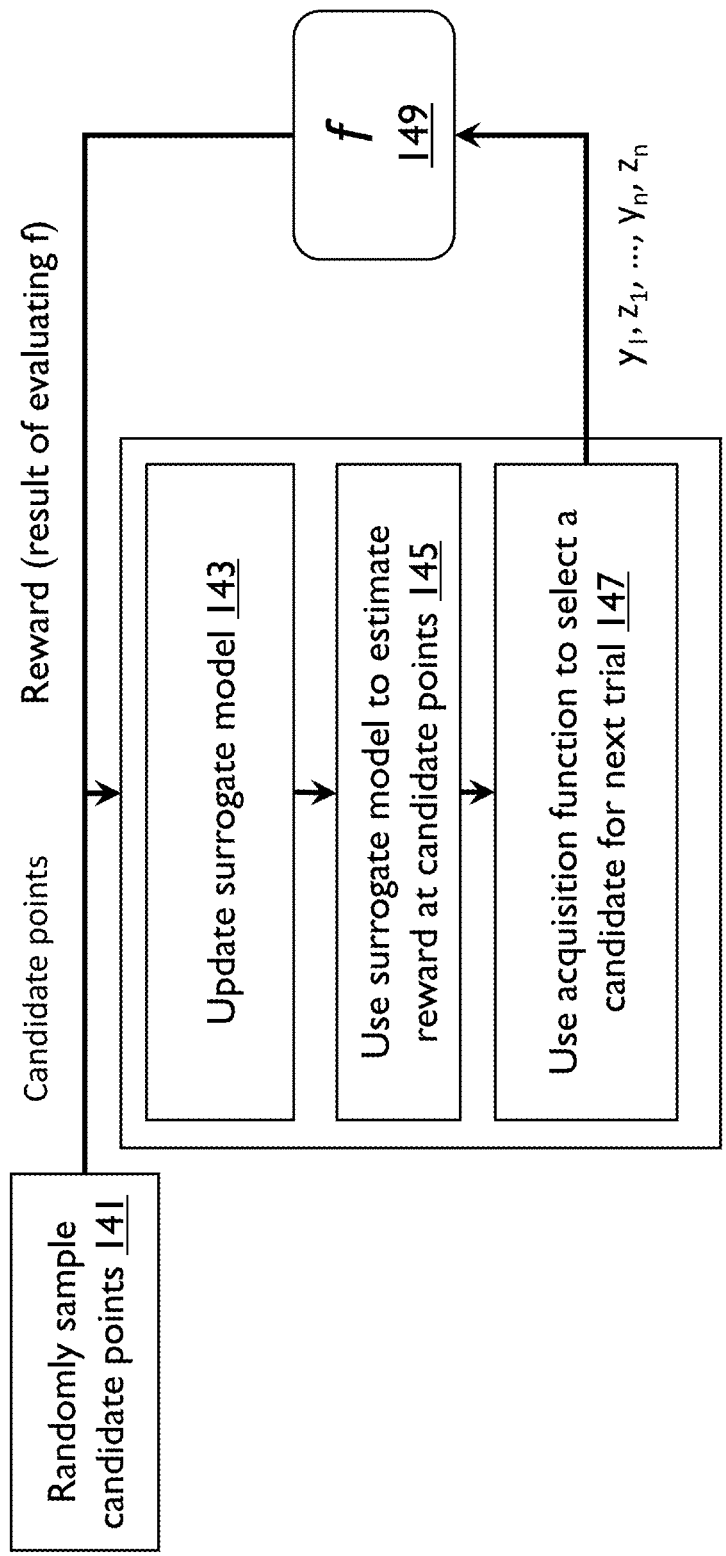
FIG. 10 shows a flow chart for unconstrained black box optimization, in accordance with an aspect of the invention.

FIG. 10 shows one example of how to find the timeout and retry values. See also FIG. 13. In one or more embodiments, the parent should wait while the child is active. Suppose there is a range for both y (timeout between gateway 131 and service 133) and $y_2$ (timeout between service 133 and service 135) between zero and ten seconds. Consider how to select values such that $y_1 \geq y_2$. This plots as a square box with sides of length 10 seconds. The constraint turns the space into a triangle 151. It is desired to find $y_1$ and $y_2$ values within the triangle that satisfies $y_1 \geq y_2$. One or more embodiments carry out the optimization by searching for random points $y_1$, $y_2$ within the triangle. For example, search for 10,000 points. Then, decide which points to try out sequentially, as described herein. A novel aspect of one or more embodiments is how to come up with the random points—one or more embodiments employ extended or marginalized Gibbs sampling. In this aspect, generate a large number of random points that satisfy the constraint(s). One or more embodiments: (i) randomly generate sample points; and (ii) use a Bayesian search algorithm. The exemplary embodiments of FIGS. 10, 11, and 12 all use the same Bayesian search algorithm, but can employ different techniques to generate the randomly-sampled points. There might be, for example, ten thousand points; it is not feasible to try all of them. For the Bayesian search algorithm, start with a collection of points that all satisfy the constraint. Generating this collection of points is challenging and one or more embodiments provide a significant advance therein, as shown at step 141B in FIG. 12.

Figure 13:
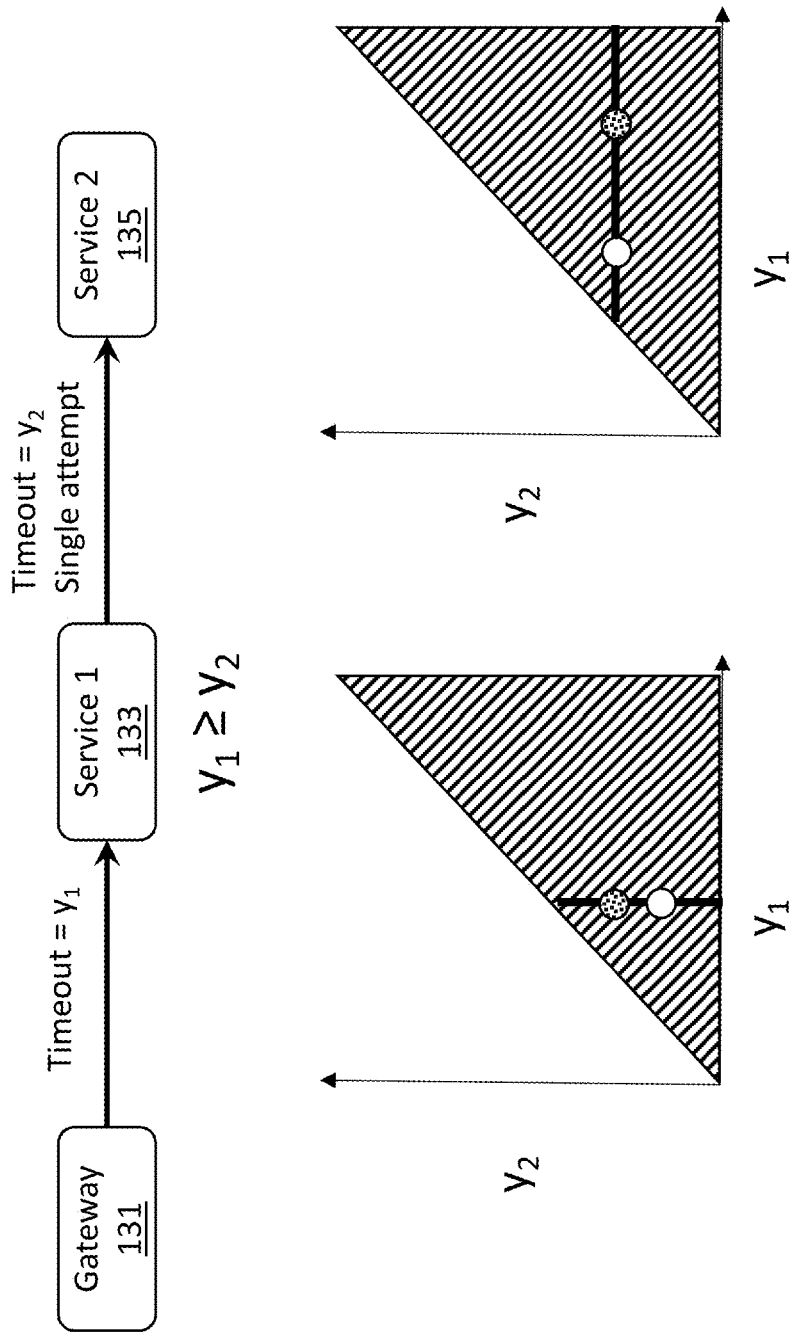
FIG. 13 shows an exemplary application of aspects of the invention using Gibbs sampling.

Referring to FIG. 13, in the left-hand triangle, fix the value of $y_1$. Start at the initial (open) point. Then select any value of $y_2$ on the vertical line. Choose the new (filled) point. In the right-hand triangle, fix $y_2$. Start at the initial (open) point and pick any other point on the horizontal line; e.g., the new (filled) point. Thus, one or more embodiments fix $y_1$ and move $y_2$ randomly, or fix $y_2$ and move $y_1$ randomly. This is repeated a number of times to obtain a number of random points inside the triangle. The technique can be generalized to systems with more than two variables.

A Bayesian algorithm will try out, say, twenty points, but in a systematic way—other techniques are also available, as will be appreciated by the skilled artisan, given the teachings herein. One or more embodiments employ an initial pool of random points, created via embodiments of the invention, to enable this. A novel aspect of one or more embodiments is seeding the search via initial choice of random points that satisfy the constraints.

Figure 11:
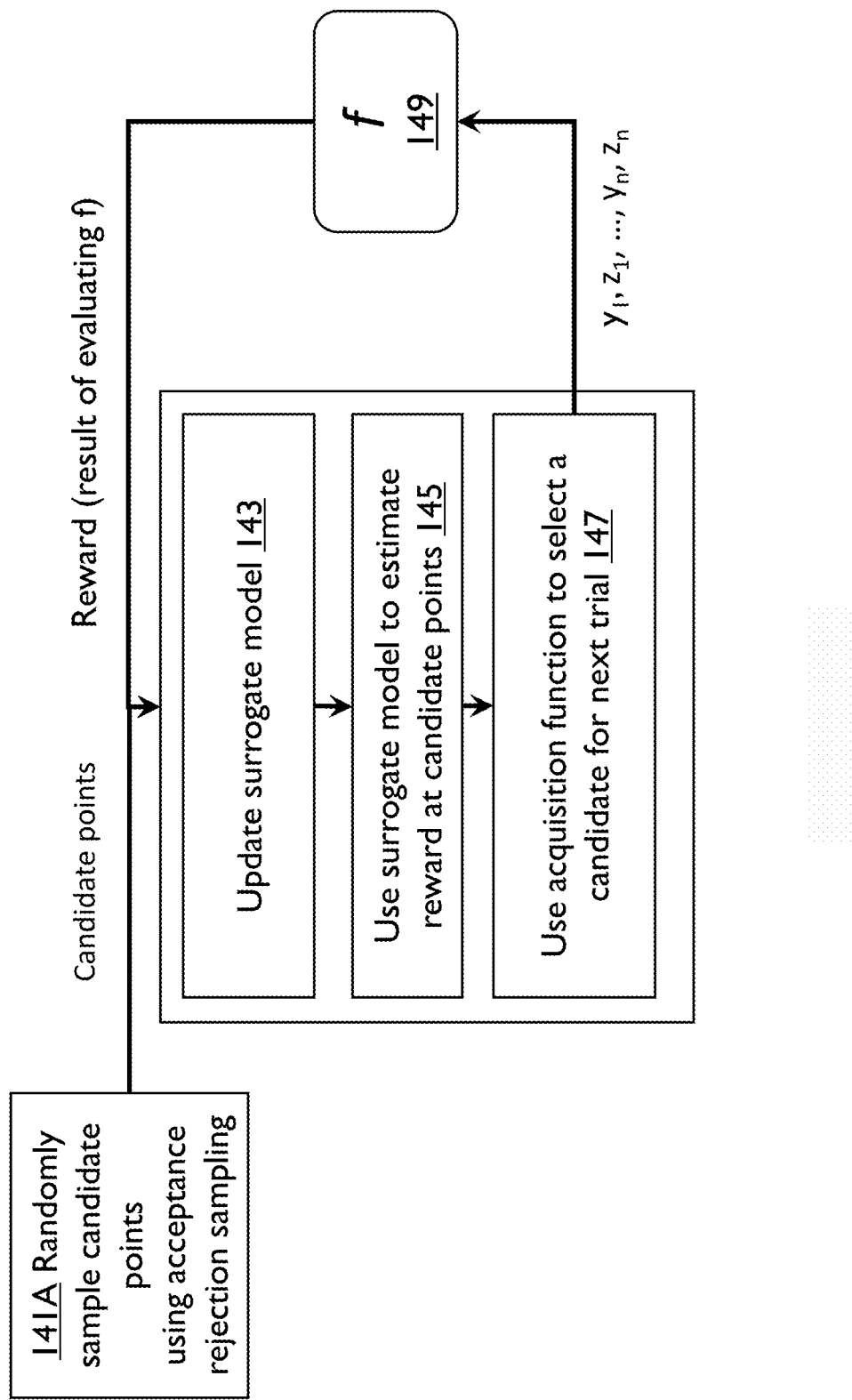
FIG. 11 shows a flow chart for black box optimization with constraints, in accordance with an aspect of the invention.
Figure 12:
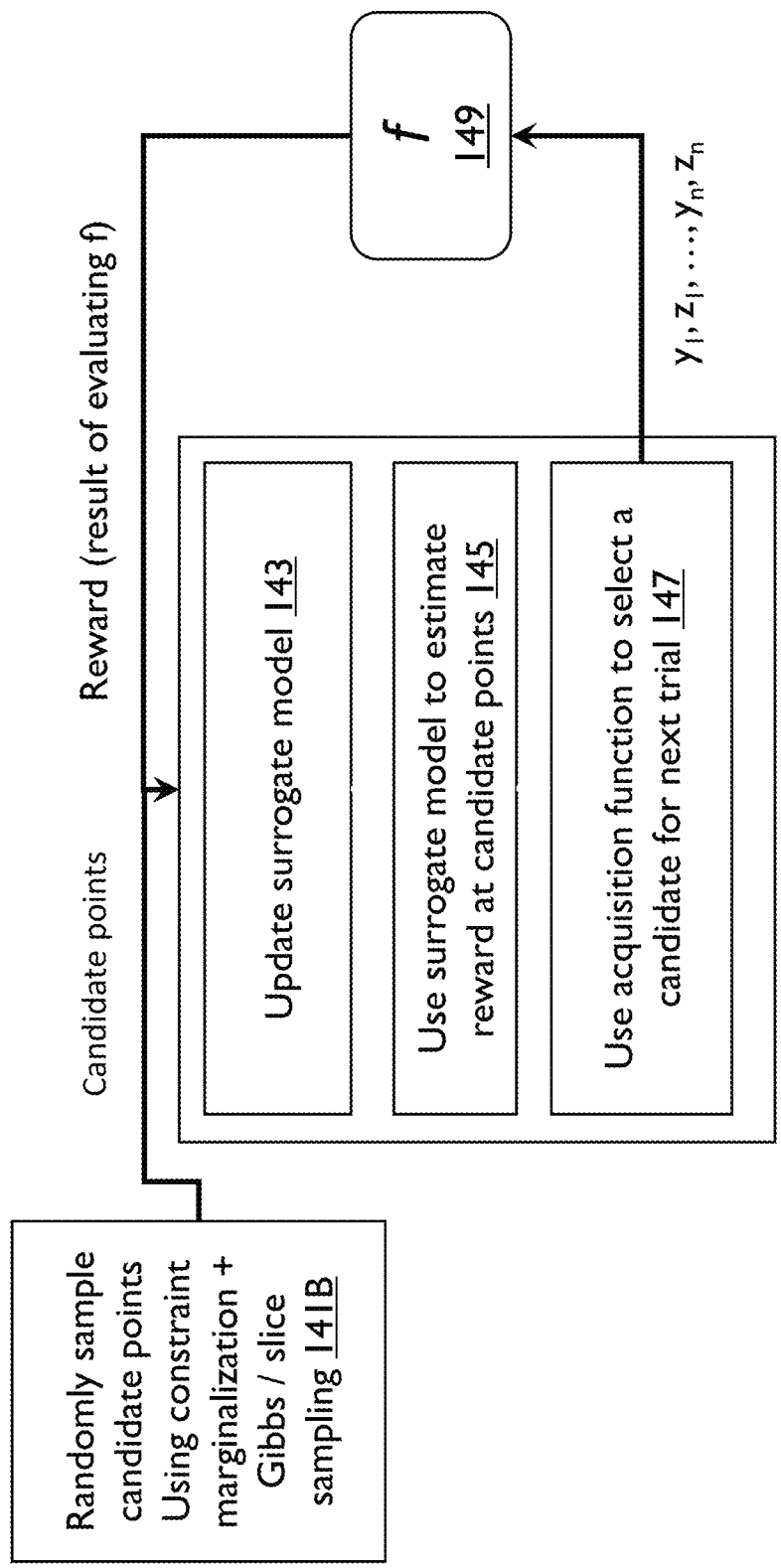
FIG. 12 shows a flow chart for optimization in accordance with an aspect of the invention.

Referring again to FIG. 10, in one or more embodiments, in step 141, randomly sample candidate points. In step 143, update the surrogate model, taking as input the candidate points and the reward (result of evaluating ƒ, step 149, discussed below). In step 145, use the surrogate model to estimate the reward at the candidate points. In step 147, use the acquisition function to select a candidate for the next trial. The acquisition function outputs a set of points $x_1$, $z_1$, ..., $y_n$, $z_n$, which are input to function ƒ 149 to determine the reward. FIG. 11 shows a flow chart similar to FIG. 10, except that step 141A involves randomly sampling candidate points using acceptance rejection sampling, a state-of-the-art black box optimization with constraints. FIG. 12 shows a flow chart similar to FIG. 10, except that step 141B involves randomly sampling candidate points using constraint marginalization and Gibbs/slice sampling. Note that "Gibbs" sampling and "slice" sampling are two different techniques. Gibbs sampling is useful, for example, when the prior distribution is uniform. Slice sampling is useful in the more general case where the prior distribution may not be uniform. Heretofore, techniques depicted in FIGS. 10-12 have not been used for optimizing cloud micro services; FIG. 12 introduces a random sampling technique in step 141B not employed before in any application.

One or more embodiments randomly sample candidate points using constraint marginalization; for example, fix the initial point from the feasible region, and iteratively sweep through the parameters. In this regard, fix n−1 parameters, compute the feasible range of the remaining parameter, and use Gibbs or slice sampling to move the remaining parameter to a random value. Constrained black box optimization is a novel way of auto tuning cloud micro services; there is currently no known solution for constrained optimization of cloud micro service communication parameters. One or more embodiments advantageously use constraint marginalization, Gibbs or slice sampling for black box optimization. One or more embodiments speed up the process of discovering good parameters for micro services under constraints, and/or improve the final reward based on the micro services parameters.

One or more embodiments provide a method for setting the resiliency parameters of cloud micro service applications. In some instances, the resiliency parameters are determined through a sequence of trials. In one or more embodiments, an acquisition function decides the parameter values for the next trial from a pool of randomly sampled candidate parameter values based on the results of the previous trials. The sampling of the candidate parameter values is achieved, for example, by Gibbs or slice sampling along with constraint marginalization.

A variety of methods (e.g., expected improvement, probability of improvement, etc.) can be used by the acquisition function for deciding which candidate parameters are to be used for trials. A variety of surrogate models (e.g., Gaussian Processes) can be used to estimate reward for candidate parameters. A variety of reward functions can be used as the objective. One or more embodiments provide enhanced microservices mesh in a cloud environment, and/or autotuning-as-a-service (ATaaS) in a cloud environment, improving the operational efficiency of internal and/or external customers of a cloud environment.

In one or more embodiments, the topology of the micro services application is represented by a tree $T=(V, E)$ which is directed outward. The nodes in this tree correspond to the micro services and are denoted by $s_1, \ldots, s_n$ with service $s_1$ corresponding to the root. A node in this tree can communicate with its children either sequentially or in parallel depending on the internal logic of the corresponding micro services. This information is supplied as part of the input and denoted using the comm(•) function. For any non-leaf node u in T, comm(u) can be take on the values s e q or par. If comm(u)=seq, then u is understood to communicate with its children sequentially; otherwise, u communicates with its children in parallel. Note that comm(u) is meaningful only when u has at least two children.

Consider a non-root node v in T whose parent node is u. Associate a 'timeout' parameter t (v) and a 'retries' parameter a(v) with node v which respectively indicate the timeout used by u when it queries v and the number of times u queries v before aborting its request. The parameter settings of all the non-root nodes in Tare collectively denoted by the 'policy' π. A request from u to v is the to be completed as soon as one of the following two events occur: 1) u receives a response from v, or 2) u times out in each of the a(v) queries it has made to v as part of this request.

If $u \neq s_1$, i.e., it is not the root node, then it can be informally stated that the communication constraint associated with it as follows. Let w be the parent of u.

A query from w to u should not timeout when a request from u to a child of u is yet to complete.

Let C(u) denote the children of u. The above can be stated formally as follows:

For any internal node $u \neq s_1$ of T, $$t(u) \geq \begin{cases} \Sigma_{v \in C(u)} T(v)a(v) & \text{if } comm(u) = \text{seq} \\ \max_{v \in C(u)} T(v)a(v) & \text{if } comm(u) = \text{par} \end{cases} \quad \text{(Eq. 1)}$$

In addition to the above validation constraints, one or more embodiments also place range constraints over parameters as by requiring all timeout parameters to be in the range $[t_{min}, t_{max}]$ and all retry parameters to belong to $\{1, \ldots, k\}$ where k is a fixed positive integer.

For any non-root node $u \neq s_1$ of T, $$t(u) \in [t_{min}, t_{max}] \quad \text{(Eq. 2)}$$

$$a(v) \in \{1, \ldots, k\} \quad \text{(Eq. 3)}$$

Figure 14:
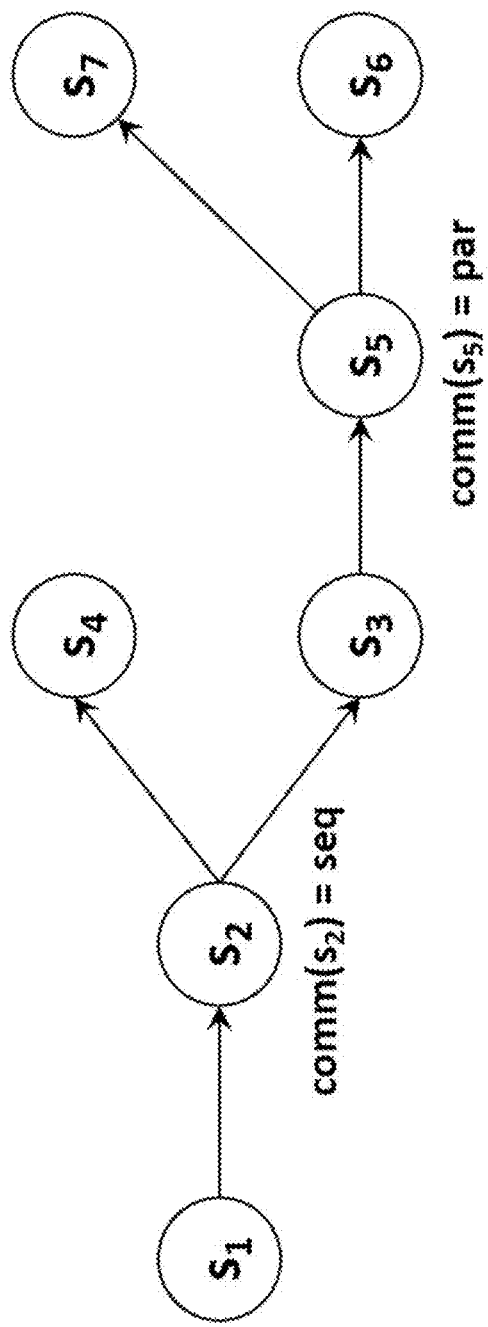
FIG. 14 shows an exemplary micro services application topology with seven services, amenable to optimization in accordance with an aspect of the invention.

FIG. 14 illustrates validation and range constraints using a sample topology; in particular, a micro services application topology with 7 services. The constraints are: 1) $t(s_2) \geq t(s_3)a(s_3)+t(s_4)a(s_4)$; 2) $t(s_3) \geq t(s_5)a(s_5)$; 3) $t(s_5) \geq \max\{t(s_6)a(s_6), t(s_7)a(s_7)\}$; 4) $\forall s \in \{s_2, \ldots s_7\}: t(s) \in [1.0, 10.0]$; and 5) $\forall s \in \{s_2, \ldots s_7\}: a(s) \in \{1, 2, 3\}$. The first three are validation constraints while the last two are range constraints with $t_{min}=1.0$, $t_{max}=10.0$ and k=3.

The SLA optimization problem seeks to find a valid policy R (i.e., parameters satisfying Eq. 1, Eq. 2, and Eq. 3) which minimizes timeout related errors while ensuring that the end-to-end latency is within a predefined threshold lmax. Let $e_\pi(u)$ denote the error rate of u—this is the fraction of requests to node u which are aborted due to timeout related errors under policy π. The error rates of all the non-root nodes are collectively represented using the error vector $e_\pi$. The error rates at different services might not be equally important. To model this heterogeneity, one or more embodiments use the normalized weight vector w which has a component corresponding to each component of $e_\pi$. The components of w are non-negative and sum up to 1. The weighted error rate $\rho(\pi)$ is defined as the dot product $e_\pi \cdot w$. This is the quantity desired to be minimized in one or more embodiments.

The end-to-end latency $l(\pi)$ of the application, experienced at the root node $s_1$, can be measured in a variety of ways. Herein, the $p^{th}$ percentile latency experienced at Si is used as the measure of end-to-end latency. As part of SLA optimization, one or more embodiments seek a policy π which can ensure that $l(\pi) \leq l_{max}$. The values of p, $l_{max}$ and w are fixed and provided as part of the input to the SLA optimization problem. It should be noted that $\rho(\pi)$ and $l(\pi)$ are both random variables, and $e(\pi)$ is a random vector, and they are noisy functions of the policy π. In order to aid the use of Bayesian optimization in the solution, one or more embodiments combine $\rho(\pi)$ and $l(\pi)$ into a single 'reward' metric $r(\pi)$ as follows, where e is the natural number and "**" means raising to an exponent:

if $l(\pi) > l_{max}$, then $r(\pi) = e^{**}((l_{max}/l(\pi))-1)-1$ if $l(\pi) \leq l_{max}$, then $r(\pi) = 1 - \rho(\pi)$ (Eqs. 4)

This definition of the reward ensures several desirable properties. First, the reward is always in the interval $[-1, 1]$. It is negative if and only if $l(\pi) > l_{max}$ and non-negative otherwise. Second, when the reward is negative, the magnitude of reward increases as the ratio $l_{max}/l(\pi)$ decreases—thus, the further the end-to-end latency $l(\pi)$ exceeds the threshold $l_{max}$, the more negative the reward. Third, when the reward is positive, the magnitude of the reward is an increasing function of the weighted 'success' rate $1-\rho(\pi)$.

The SLA optimization problem can now be succinctly stated as the problem of finding a policy π which maximizes r (π) while satisfying the constraints of Eq. 1, Eq. 2, and Eq. 3. Consider the example in FIG. 14. Suppose the weight vector w in this example equals (0.2, 0.2, 0.1, 0.1, 0.2, 0.2), where the components of w correspond to services $s_2$, $s_3$, $s_4$, $s_5$, $s_6$ and $s_7$ respectively. Service $s_2$ communicates sequentially with services $s_4$ and $s_3$, while service $s_5$ communicates in parallel with services $s_6$ and S. Suppose under the current policy $\pi$, the error rate vector e, equals (0.05, 0.3, 0.15, 0.2, 0.0, 0.6). Then the weighted error rate $\rho(\pi)$ equals e, w=0.225. Suppose $l_{max}$=2.5 sec and p=95. The value of the reward $r(\pi)$ now depends on the $95^{th}$ percentile latency $l(\pi)$ experienced at the root node $s_1$. For instance, if $l(\pi)$=1.8, then the reward is positive and equals 1−$\rho(\pi)$=0.775. On the other hand, if $l(\pi)$=2.9, then the reward is negative and equals e((2.5/2.9)−1)−1≅0.129, where  indicates raising to an exponent.

Figure 15:
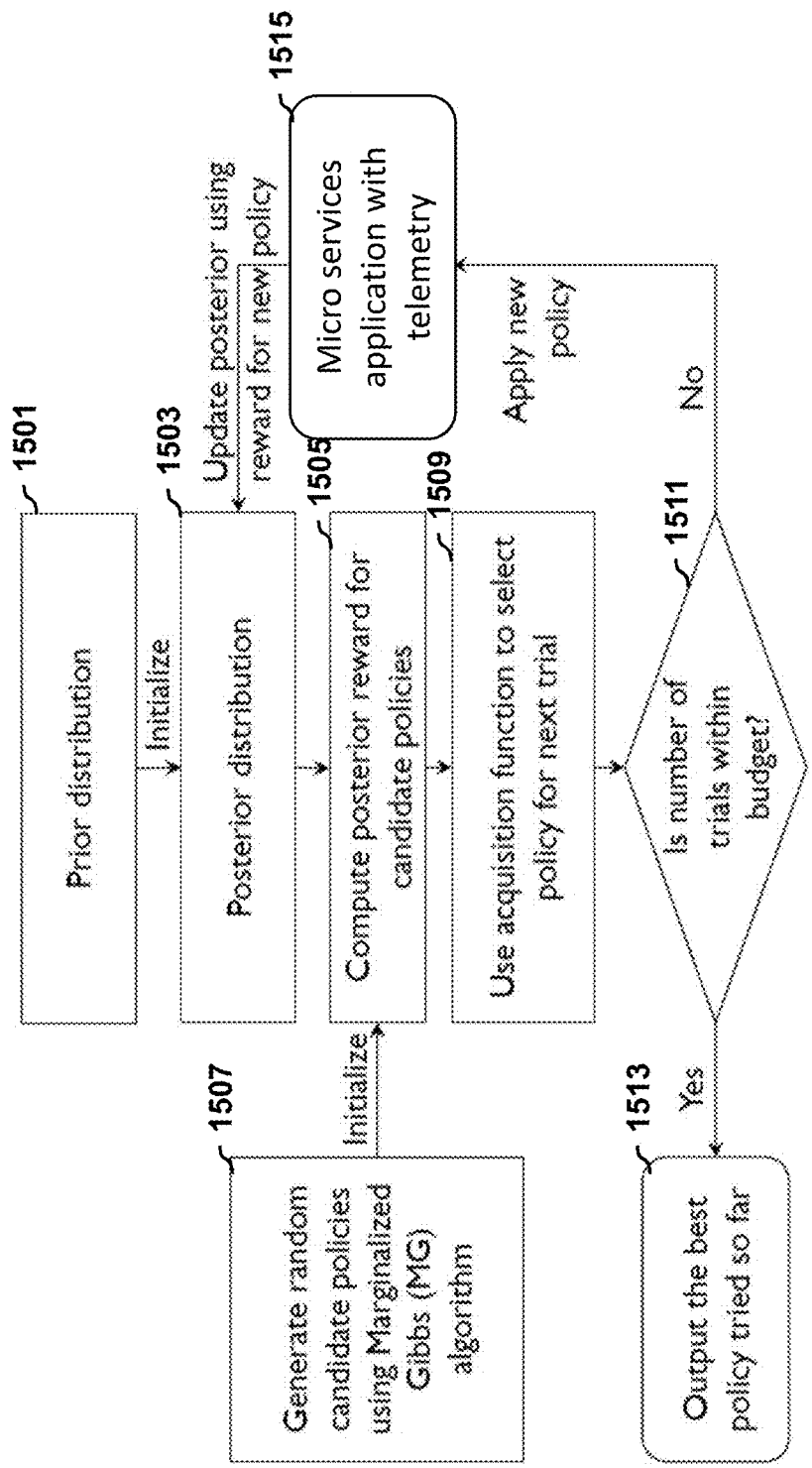
FIG. 15 shows an exemplary Bayesian strategy for service level latency agreement (SLA) optimization, in accordance with an aspect of the invention.

The Bayesian optimization (BO) strategy for the SLA optimization problem is depicted in FIG. 15. BO is a derivative-free sequential strategy for global optimization of noisy black-box functions which are expensive to evaluate. The term black-box indicates the fact that the objective function is not explicitly specified as a function of the optimization variables. Given the teachings herein, including clearly specified algorithms, the skilled artisan will be able to make and use embodiments of the invention without undue experimentation; i.e., "black box" is used as a term of art as just defined and not in the sense that some undisclosed black box is required to implement embodiments of the invention. The BO strategy treats the objective function as a random function and places a prior distribution 1501 over it. After gathering the reward information from multiple trials, the prior distribution is updated to form the posterior distribution 1503. This posterior distribution is used by an acquisition function (in step 1509) which determines what the next policy to be evaluated should be. A variety of acquisition functions have been studied in the literature for applications other than cloud microservices, including probability of improvement, expected improvement, expected loss, upper confidence bounds (UCB), Thompson sampling or a mixture of the above. Bayesian search has never been used for cloud microservices but has been used for other applications. A variety of acquisition functions have been used in these prior applications of Bayesian search in fields other than cloud microservices. There are two parts to Bayesian search in one or more embodiments: (i) generation of random samples; and (ii) search strategy. Some search strategies are known from other fields but the inventive sample generation 141B advantageously is faster and generates more useful results. Sample generation not using techniques of the invention can be very time consuming and may not generate useful results. The acquisition function trades-off exploration and exploitation so as to maximize the reward within a limited number of trials specified as part of the input.

In particular, in step 1501, begin with the prior distribution, and initialize to obtain the posterior distribution 1503. Meanwhile, in step 1507, generate random candidate policies using the Marginalized Gibbs (MG) algorithm, and carry out an initialization, based on same, as input to step 1505, wherein the posterior reward for the candidate policies is computed based on steps 1503 and 1507. Then, in step 1509, use the acquisition function to select the policy for the next trial. In decision block 1511, determine whether the number of trials is within budget. If the budget is exceeded (YES branch) proceed to step 1513 and output the best policy tried thus far. If the budget is not yet exceeded (NO branch), apply the new policy, proceed to step 1515, then update the posterior using the reward for the new policy and return to step 1503. Compare step 1515 to the reward function, $f$, numbered 149 in FIG. 12. The reward function uses latency and error rate, which are determined from the telemetry.

Note that the aspects of FIG. 15 can be generally applied to problems other than microservices optimization.

A pertinent aspect of the BO strategy is the random sample of candidate policies over which it searches for the optimal policy and which is generated at the start of the optimization. The Marginalized Gibbs (MG) algorithm described below describes how to construct a random candidate policy through a perturbation technique which starts with a fixed initial policy as an input. The random sample is generated by applying the MG algorithm n times (possibly in parallel), where n is the sample size. Algorithm 1 in FIG. 16 presents the pseudocode for the marginalized Gibbs sampling. The algorithm initializes policy y to a fixed policy x which is valid and supplied as part of the input. The algorithm iteratively updates y; after the number of iterations equals the burn-in, the algorithm terminates by returning the value of y. In each iteration, the algorithm sweeps through y updating each parameter in y in turn. Suppose z is the parameter currently under consideration within the current iteration. The algorithm first computes the feasible range for z by plugging in the current value of all parameters other than z into Eq. 1. It then samples a value uniformly at random from this range and updates z to this newly sampled value. This constitutes a single update step of the algorithm (Line 7).

Consider the example in FIG. 14. Suppose Algorithm 1 of FIG. 16 has gone through a few iterations and at the beginning of the current iteration, the timeout parameters are (8.9, 4.8, 1.6, 3.6, 2.0, 1.5) and the retry parameters are (2, 1, 2, 1, 1, 2). These values correspond to services ($s_2$, $s_3$, $s_4$, $s_5$, $s_6$, $s_7$) respectively. Verify that these values satisfy the constraints in FIG. 14: Let z=t ($s_2$) be the first parameter considered in this iteration (Line 3). Since $t_{min}$=1.0 and $t_{max}$=10.0 in FIG. 14, we have 1.0≤t ($s_2$)≤10.0. Further, the constraint of Eq. 1 requires that t ($s_2$)≥t ($s_3$)a($s_3$)+t ($s_4$)a($s_4$) 4.8*1+1.6*2=8.0. Hence, the feasible range for t ($s_2$) is [8.0, 10.0] when holding all the other parameters fixed at their current values. The algorithm uniformly selects a value in this range (Line 6) and assigns it to t($s_2$) (Line 7). Suppose this new value of t($s_2$) equals 8.2. Further, in the next step of the for loop (Line 3), suppose the parameter being considered is z=a($s_4$), the retry parameter of $s_4$. Since k=3 in FIG. 14, obtain a($s_4$)∈{1, 2, 3}. Further, the validation constraint mentioned above implies:

$$a(s_4) \leq \frac{t(s_2) - t(s_3)a(s_3)}{t(s_4)} = (8.2 - 4.8^*1)/1.6 = 2.125.$$

Hence, the feasible range for a($s_3$) is {1, 2}. The algorithm selects one of these two possible values uniformly at random, assigns it to a($s_3$), and continues to fix the remaining parameters in this iteration.

One or more embodiments focus on optimizing resiliency parameters of cloud micro services using a new technique for constrained black box optimization. One or more embodiments relate to sampling data points for optimizing resiliency parameters of cloud applications; the constraints on points being sampled, in one or more embodiments, are specified in the form of algebraic equations on real-valued random variables that are sampled from the distribution. One or more embodiments deal with sampling points for setting the timeout and retry parameters of a cloud application. It is worth noting that the prior-art idea of sampling random points and checking for feasibility of constraints is not a practical solution for setting the timeout and retry parameters of a cloud application since rejection sampling of this kind will take too long to generate even a single feasible point. One or more embodiments employ Markov chain Monte Carlo (MCMC) techniques to accomplish sampling of candidate points. One or more embodiments deal with sampling candidate points from constrained spaces. The candidate points sampled in one or more embodiments are generally not constrained to be within a sample region (in particular, there are integrality constraints on the retry parameters in our one or more embodiments which renders the problem non-convex). There are multiple integrality and non-convex constraints on candidate points sampled by one or more embodiments.

One or more embodiments provide efficient sampling from constrained search spaces through marginalization. Blackbox optimization is the task of optimizing the reward of a system which is influenced by a (vector-valued) parameter which needs to be chosen by the optimizer; the reward is not specified as an analytical function of the parameter but there is a limited budget for evaluating the function at different query points which correspond to distinct parameter values. Further, the evaluation is assumed to yield a reward value which could potentially be corrupted by noise. Since black box optimization makes minimal assumptions on the problem domain, it is applicable for an extremely large class of application domains including tuning hyperparameters in machine learning, optimizing communication parameters of micro services, optimizing parameters of web services, and optimization of cyber-physical systems.

It is often the case in black box optimization algorithms that the set of query points are themselves chosen from a pool of candidate points which are sampled from the space of feasible parameter values. When the parameter space is unconstrained, this sampling is generally easy to perform. However, in the presence of constraints on the parameter, the sampling needs to be performed carefully so that the candidate points satisfy the constraints. One method to do ensure this is through acceptance-rejection sampling which is a Monte Carlo sampling technique which guarantees feasibility. Unfortunately, the time required for obtaining a feasible candidate point can be high for acceptance-rejection sampling making this impractical for many problem domains. In general, the problem of efficiently sampling from a parameter space which is constrained is a difficult challenge.

One or more embodiments provide a technique called marginalization which significantly decreases the time required to sample a candidate point from a constrained space. One or more embodiments start from an initial point which is feasible (but not necessarily random) and incrementally modify it in a careful step-by-step manner to obtain a final point which is both feasible and random. This procedure is referred to herein as marginalization.

One or more embodiments include the following phases. In phase 1, start with an initial feasible parameter value. In phase 2, modify this initial feasible value into a final feasible value in a sequence of 'n' iterations, where 'n' is a tunable hyper-parameter. Each of the 'n' iterations is further broken down into 'd' steps, where 'd' is the number of components in the parameter. Step 'i' is performed as follows: Determine the feasible region for the component 'i' given the current values of all the other components; randomly choose a value from this feasible region and set it as the new value for component i. If the feasible region cannot be computed, or if the computed value is empty, the algorithm terminates by emitting one of the feasible values of the parameter seen up to this point. Otherwise, it emits the final feasible value at the end of the 'n' iterations.

Given the discussion thus far, it will be appreciated that, in general terms, an exemplary method, according to an aspect of the invention, includes the step of obtaining a specification of a topology (e.g. tree T) of a microservices application as a plurality of nodes corresponding to a plurality of microservices of the microservices application. The plurality of nodes include a root node. Each of the plurality of nodes other than the root node has a timeout parameter and a retries parameter (e.g., t(v) and a(v) respectively).

One or more embodiments further include, via constrained black box optimization, selecting optimized values for the timeout parameter and the retries parameter for each of the plurality of nodes other than the root node, subject to satisfying a specified end-to-end latency (e.g. $l(\pi)$) for the microservices application and minimizing an error rate (e.g. $\rho(\pi)$) for the microservices application. Further steps include configuring the microservices application in accordance with the optimized values (i.e. setting the optimized values for timeout and retry); and responding to at least one external request to the root node (e.g. $s_1$) with the microservices application configured in accordance with the optimized values.

In one or more embodiments, the constrained black box optimization in the selecting step is further subject to: (i) a condition that a query received at a given one of the plurality of nodes other than the root node should not time out when a request from the given one of the plurality of nodes other than the root node to a child node of the given one of the plurality of nodes other than the root node is yet to complete (Eq. 1); (ii) a specified range of permissible timeout values (Eq. 2); and (iii) a specified range of positive integer retry values (Eq. 3).

In one or more embodiments, referring to FIGS. 12 and 15, the constrained black box optimization includes, as at 1507, generating random candidate policies via the marginalized Gibbs algorithm. Each candidate policy includes candidate values for the timeout parameter and the retries parameter for each of the plurality of nodes other than the root node. Also included in the constrained black box optimization are, as at 1505, estimating a reward for all candidate policies; as at 1509, selecting a next candidate policy by using an acquisition function, based on the estimated reward function; and, as per decision block 1511, with the next candidate (trial) policy, repeating the estimating and selecting steps a predetermined non-zero number of times to obtain the optimized values. The predetermined non-zero number of times could be, for example, until a number of trials exceeds a pre-determined budget. Then, at 1513, emit the best policy tried. Note that the candidate itself is a sample point.

In one or more embodiments, there is an estimated reward for each of the points/policies. Based on the estimated reward, select the next trial point/policy, using a trial and error approach. In the present context, a sample refers to multiple points. In one or more embodiments, update the reward for all the candidate points/policies based on the trial point/policy. Based on the new reward, try a new point/policy. In step 1505, compute the posterior reward for all candidate points/policies. In step 1509, use the acquisition function to obtain one next trial point/policy, try it out and update.

As noted, in one or embodiments, the reward function is defined to reside in an interval from minus one to plus one, and is negative if and only if calculated end-to-end latency exceeds the specified end-to-end latency.

In at least some instances, in the obtaining step, the specification of the topology of the microservices application further includes, for each given one of the plurality of nodes other than the root node, having multiple child nodes, a specification whether each given one of the plurality of nodes other than the root node, having the multiple child nodes, communicates with the multiple child nodes sequentially (comm(u)=s e q) or in parallel (comm(u)=par). In the former case (sequential), the condition that the query received at the given one of the plurality of nodes other than the root node should not time out when a request from the given one of the plurality of nodes other than the root node to a child node of the given one of the plurality of nodes other than the root node is yet to complete, includes setting a timeout of the given one of the plurality of nodes other than the root node, having the multiple child nodes, to at least equal a sum of a product of timeout and retry for each of the multiple child nodes. See FIG. 8. In the latter case (parallel), the condition that the query received at the given one of the plurality of nodes other than the root node should not time out when a request from the given one of the plurality of nodes other than the root node to a child node of the given one of the plurality of nodes other than the root node is yet to complete, includes setting a timeout of the given one of the plurality of nodes other than the root node, having the multiple child nodes, to at least equal a maximum value of a product of timeout and retry for each of the multiple child nodes. See FIG. 9.

In some cases, all the method steps run on the same processor(s) that the microservices run on (e.g., server); in other cases, optimization can be carried out separately (e.g., in the cloud) and then the optimal policy is provided to the processor(s) that the microservices run on (e.g., server). Note, however, that as different trials are carried out to try and determine the parameter settings, as part of the trials, in one or more embodiments, the microservices application will be configured each time with a new parameter setting—run, determine the reward, reconfigure, repeat. Finally, configure the microservices application with the best policy and operate it with that. Thus, in one or more embodiments, even during the experimentation, the microservices application is being reconfigured.

Figure 17:
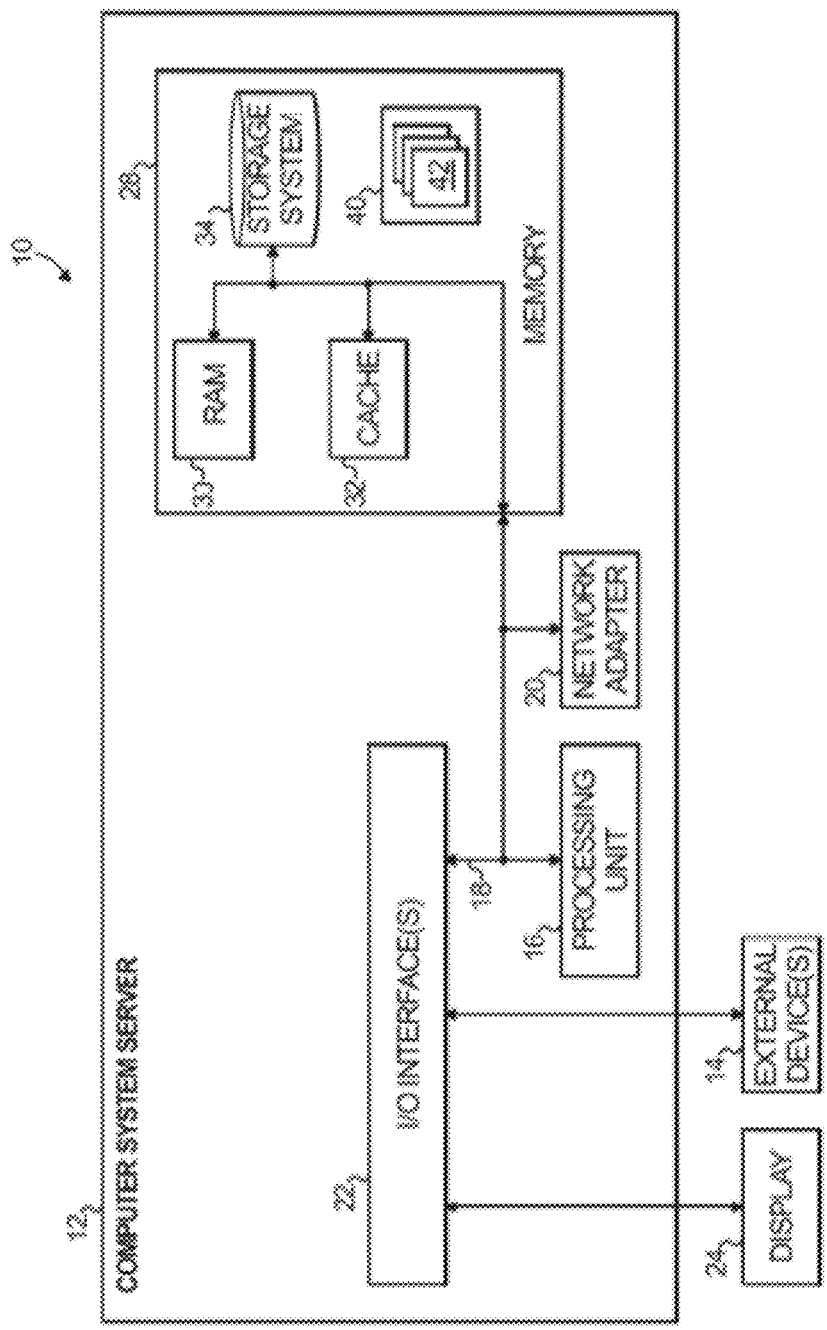
FIG. 17 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 17 depicts a computer system that may be useful in implementing one or more aspects and/or elements of the invention, also representative of a cloud computing node according to an embodiment of the present invention. Referring now to FIG. 17, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 17, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 17) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., an application 96 for constrained optimization of cloud micro services; this application could also reside in the management layer if desired, or portions of the functionality could reside in each of layers 80, 90.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining a specification of a topology of a microservices application as a plurality of nodes corresponding to a plurality of microservices of said microservices application, said plurality of nodes including a root node, each of said plurality of nodes other than said root node having a timeout parameter and a retries parameter;

via constrained black box optimization, selecting optimized values for said timeout parameter and said retries parameter for each of said plurality of nodes other than said root node, subject to satisfying a specified end-to-end latency for said microservices application and minimizing an error rate for said microservices application;

configuring said microservices application in accordance with said optimized values; and responding to at least one external request to said root node with said microservices application configured in accordance with said optimized values, wherein said constrained black box optimization comprises:
generating random candidate policies via a marginalized Gibbs algorithm, wherein each candidate policy comprises candidate values for said timeout parameter and said retries parameter for each of said plurality of nodes other than said root node;
estimating a reward function for all said candidate policies;
selecting a next candidate policy by using an acquisition function, based on said estimated reward function; and
with said next candidate policy, repeating said estimating and selecting steps a predetermined non-zero number of times to obtain said optimized values.

2. The method of claim 1, wherein said constrained black box optimization in said selecting step is further subject to:
a condition that a query received at a given one of said plurality of nodes other than said root node should not time out when a request from said given one of said plurality of nodes other than said root node to a child node of said given one of said plurality of nodes other than said root node is yet to complete;
a specified range of permissible timeout values; and
a specified range of positive integer retry values.

3. The method of claim 2, wherein said reward function is defined to reside in an interval from minus one to plus one, and is negative if and only if calculated end-to-end latency exceeds said specified end-to-end latency.

4. The method of claim 3, wherein, in said obtaining step, said specification of said topology of said microservices application further comprises, for each given one of said plurality of nodes other than said root node, having multiple child nodes, a specification whether each given one of said plurality of nodes other than said root node, having said multiple child nodes, communicates with said multiple child nodes sequentially or in parallel.

5. The method of claim 4, wherein, for a given one of said plurality of nodes other than said root node, having said multiple child nodes, which communicates with said multiple child nodes sequentially, said condition that said query received at said given one of said plurality of nodes other than said root node should not time out when a request from said given one of said plurality of nodes other than said root node to a child node of said given one of said plurality of nodes other than said root node is yet to complete, comprises setting a timeout of said given one of said plurality of nodes other than said root node, having said multiple child nodes, to at least equal a sum of a product of timeout and retry for each of said multiple child nodes.

6. The method of claim 4, wherein, for a given one of said plurality of nodes other than said root node, having said multiple child nodes, which communicates with said multiple child nodes in parallel, said condition that said query received at said given one of said plurality of nodes other than said root node should not time out when a request from said given one of said plurality of nodes other than said root node to a child node of said given one of said plurality of nodes other than said root node is yet to complete, comprises setting a timeout of said given one of said plurality of nodes other than said root node, having said multiple child nodes, to at least equal a maximum value of a product of timeout and retry for each of said multiple child nodes.

7. The method of claim 2, further comprising reconfiguring said microservices application during each repeating step.

8. A non-transitory computer readable medium comprising computer executable instructions which when executed by a computer cause the computer to perform a method of:
obtaining a specification of a topology of a microservices application as a plurality of nodes corresponding to a plurality of microservices of said microservices application, said plurality of nodes including a root node, each of said plurality of nodes other than said root node having a timeout parameter and a retries parameter;
via constrained black box optimization, selecting optimized values for said timeout parameter and said retries parameter for each of said plurality of nodes other than said root node, subject to satisfying a specified end-to-end latency for said microservices application and minimizing an error rate for said microservices application;
configuring said microservices application in accordance with said optimized values; and
responding to at least one external request to said root node with said microservices application configured in accordance with said optimized values wherein said constrained black box optimization comprises:
generating random candidate policies via a marginalized Gibbs algorithm, wherein each candidate policy comprises candidate values for said timeout parameter and said retries parameter for each of said plurality of nodes other than said root node;
estimating a reward function for all said candidate policies;
selecting a next candidate policy by using an acquisition function, based on said estimated reward function; and
with said next candidate policy, repeating said estimating and selecting steps a predetermined non-zero number of times to obtain said optimized values.

9. The non-transitory computer readable medium of claim 8, wherein said constrained black box optimization in said selecting step of said method is further subject to:
a condition that a query received at a given one of said plurality of nodes other than said root node should not time out when a request from said given one of said plurality of nodes other than said root node to a child node of said given one of said plurality of nodes other than said root node is yet to complete;
a specified range of permissible timeout values; and
a specified range of positive integer retry values.

10. The non-transitory computer readable medium of claim 9, wherein said reward function is defined to reside in an interval from minus one to plus one, and is negative if and only if calculated end-to-end latency exceeds said specified end-to-end latency.

11. An apparatus comprising:
a memory; and
at least one processor, coupled to said memory, and operative to:
obtain a specification of a topology of a microservices application as a plurality of nodes corresponding to a plurality of microservices of said microservices application, said plurality of nodes including a root node, each of said plurality of nodes other than said root node having a timeout parameter and a retries parameter;

via constrained black box optimization, select optimized values for said timeout parameter and said retries parameter for each of said plurality of nodes other than said root node, subject to satisfying a specified end-to-end latency for said microservices application and minimizing an error rate for said microservices application;

configure said microservices application in accordance with said optimized values; and respond to at least one external request to said root node with said microservices application configured in accordance with said optimized values wherein said constrained black box optimization comprises:

generating random candidate policies via a marginalized Gibbs algorithm, wherein each candidate policy comprises candidate values for said timeout parameter and said retries parameter for each of said plurality of nodes other than said root node;

estimating a reward function for all said candidate policies;

selecting a next candidate policy by using an acquisition function, based on said estimated reward function; and with said next candidate policy, repeating said estimating and selecting steps a predetermined non-zero number of times to obtain said optimized values.

12. The apparatus of claim 11, wherein said constrained black box optimization in said selecting step is further subject to:

a condition that a query received at a given one of said plurality of nodes other than said root node should not time out when a request from said given one of said plurality of nodes other than said root node to a child node of said given one of said plurality of nodes other than said root node is yet to complete;

a specified range of permissible timeout values; and a specified range of positive integer retry values.

13. The apparatus of claim 12, wherein said reward function is defined to reside in an interval from minus one to plus one, and is negative if and only if calculated end-to-end latency exceeds said specified end-to-end latency.

14. The apparatus of claim 13, wherein, in said obtaining step, said specification of said topology of said microservices application further comprises, for each given one of said plurality of nodes other than said root node, having multiple child nodes, a specification whether each given one of said plurality of nodes other than said root node, having said multiple child nodes, communicates with said multiple child nodes sequentially or in parallel.

15. The apparatus of claim 14, wherein, for a given one of said plurality of nodes other than said root node, having said multiple child nodes, which communicates with said multiple child nodes sequentially, said condition that said query received at said given one of said plurality of nodes other than said root node should not time out when a request from said given one of said plurality of nodes other than said root node to a child node of said given one of said plurality of nodes other than said root node is yet to complete, comprises setting a timeout of said given one of said plurality of nodes other than said root node, having said multiple child nodes, to at least equal a sum of a product of timeout and retry for each of said multiple child nodes.

16. The apparatus of claim 14, wherein, for a given one of said plurality of nodes other than said root node, having said multiple child nodes, which communicates with said multiple child nodes in parallel, said condition that said query received at said given one of said plurality of nodes other than said root node should not time out when a request from said given one of said plurality of nodes other than said root node to a child node of said given one of said plurality of nodes other than said root node is yet to complete, comprises setting a timeout of said given one of said plurality of nodes other than said root node, having said multiple child nodes, to at least equal a maximum value of a product of timeout and retry for each of said multiple child nodes.

17. The apparatus of claim 12, wherein said at least one processor is further operative to reconfigure said microservices application during each repeating step.

* * * * *